United States Patent [19]

DeBlander

[11] Patent Number: 6,007,890

[45] Date of Patent: Dec. 28, 1999

[54] ACOUSTIC INSULATING PANELS OR ELEMENTS

[75] Inventor: Jean-Philippe Jacques DeBlander, Mundolsheim, France

[73] Assignee: The Dow Chemical Company, Midland, Mich.

[21] Appl. No.: 09/045,228

[22] Filed: Mar. 21, 1998

Related U.S. Application Data

[63] Continuation of application No. 08/648,098, filed as application No. PCT/US94/12964, Nov. 9, 1994, abandoned.

[51] Int. Cl.⁶ .................................. B32B 3/30; E04B 1/84
[52] U.S. Cl. .......................... 428/72; 52/144; 181/288; 181/290; 181/294; 181/295; 428/159; 428/166; 428/314.4; 428/322.7
[58] Field of Search ............................... 52/144; 181/284, 181/288, 290, 294, 295; 428/61, 218, 304.472, 310.5, 159, 314.4, 166, 314.8, 322.7

[56] References Cited

U.S. PATENT DOCUMENTS

| | | |
|---|---|---|
| 3,420,023 | 1/1969 | Gregori ........................................ 52/309 |
| 3,573,152 | 3/1971 | Wiley et al. ...................... 428/316.6 X |
| 4,317,503 | 3/1982 | Soderquist et al. ..................... 181/290 |
| 4,437,542 | 3/1984 | Yeager et al. ........................... 181/290 |
| 4,679,370 | 7/1987 | Samuelsson .............................. 52/407 |
| 4,796,397 | 1/1989 | Capaul ..................................... 52/144 |
| 4,909,003 | 3/1990 | Hennigan ................................. 52/144 |
| 5,186,996 | 2/1993 | Alts .......................................... 428/72 |
| 5,202,174 | 4/1993 | Capaul ................................... 428/138 |
| 5,206,082 | 4/1993 | Malone ................................... 428/294 |
| 5,217,771 | 6/1993 | Schmanski et al. ................... 428/369 |

FOREIGN PATENT DOCUMENTS

| | | |
|---|---|---|
| 0 171 691 | 2/1986 | European Pat. Off. . |
| 2 231 387 | 1/1974 | Germany . |
| 1 363 355 | 8/1974 | United Kingdom . |
| 2 027 255 | 2/1980 | United Kingdom . |
| 2 184 758 | 7/1987 | United Kingdom . |
| 93/00845 | 1/1993 | WIPO . |

Primary Examiner—Blaine Copenheaver

[57] ABSTRACT

A multilayered insulating panel having improved acoustic insulating properties and mechanical strength has two outer facings and a soft synthetic foam core having cavities. The foam core with the cavities is in intimate contact with the facings. The cavities are arranged so that the gaps between the core material and the outer facings are in alternate patterns with respect to the opposing outer facings.

10 Claims, 2 Drawing Sheets

ACOUSTIC INSULATING PANELS OR ELEMENTS

CROSS-REFERENCE TO RELATED APPLICATION

This Application is a Continuation of application Ser. No. 08/648,098, filed May 17, 1996, now abandoned, which is a National Phase PCT/US94/12964, first filed in Great Britain on Nov. 9, 1994.

The present invention refers to acoustic insulating panels or elements, more particularly, to an acoustic insulating, multilayered panel or element having a soft core with cavities.

In certain types of building construction, known as dry lining partition panels, it is customary to have a construction comprising two outer facing encompassing an air gap or cavity. Such a construction usually includes insulation boards or insulation materials applied between the facings in such a manner to provide thermal and/or acoustic insulation. Such panels are frequently used as partitions to divide the building area into separate areas, such as rooms and/or offices.

Dry lining partitions having two outer facings and a mineral fiber core are well-known in the industry and construction market as acoustic insulating partitions. However, a major disadvantage of such partitions having mineral fiber cores is the lack of mechanical strength of such fibers thereby requiring the outer facings to be fitted with screws and supported by metal or timber studs. This requires an extensive manufacturing process.

For example, U.S. Pat. No. 4,317,503 describes a sound insulating building element or structural member including a plurality of parallel sheet elements of which a first inner, thick element has a plurality of internal cavities. The first inner, thick element is constituted by a layer of mineral fibers or stiff plastic foam. A second inner stiff element which is substantially pervious to air is connected to one main surface of the first, inner element and an outer, impervious element. The outer impervious element is arranged at a small distance from the second inner element in such a manner that substantially the entire outer element can oscillate freely in relation to the second inner element. A major disadvantage of this type of building elements is the complex and costly manufacturing process of such multilayered structure.

Other known types of partitions are the multilayered structures including those having a foam or honeycomb core. The foam cores, however, although possessing suitable mechanical strength properties, possess very poor acoustic insulating properties. In order to increase the acoustic insulating properties of such partitions, the foam core would have to be of an unacceptable thickness and weight.

Partitions with outer facings and soft cores are also known as mass-spring-mass or mass-spring systems wherein the facings represent the mass and the soft core the spring. One difficulty encountered in the effort to improve acoustical properties in such systems is that while lowering the resonance frequency of a mass-spring-mass or mass-spring system, one also reduces the compressive strength thereof. As the core or spring becomes softer, the sandwich or laminate becomes very weak and difficult to use without reinforcement that, which in turn disturbs the acoustic behavior.

In view of the afore-mentioned deficiencies, it is highly desirable to provide thin panels having acoustic insulating properties and mechanical strength. It would also be desirable to provide lighter and cheaper panels without sacrificing the acoustic insulating properties and/or the mechanical strength thereof.

Accordingly, the present invention is a multilayered insulating panel or element having
(a) two outer facings (1), and
(b) a soft synthetic core material (2) wherein the soft synthetic core material (2) is a single, continuous soft synthetic foam core material having cavities (3), having intimate contact with the two outer facings (1),
wherein the panel or element possesses both acoustic insulating properties and mechanical strength.

It has been found that the use of foams with cavities as core materials in insulating panels or elements improves significantly its acoustic insulating properties. More particularly, it has been found that the preferred geometrical arrangement of the cavities according to the present invention provides significantly improved acoustic insulating properties to panels or elements without sacrificing the mechanical strength thereof.

Figure 1:
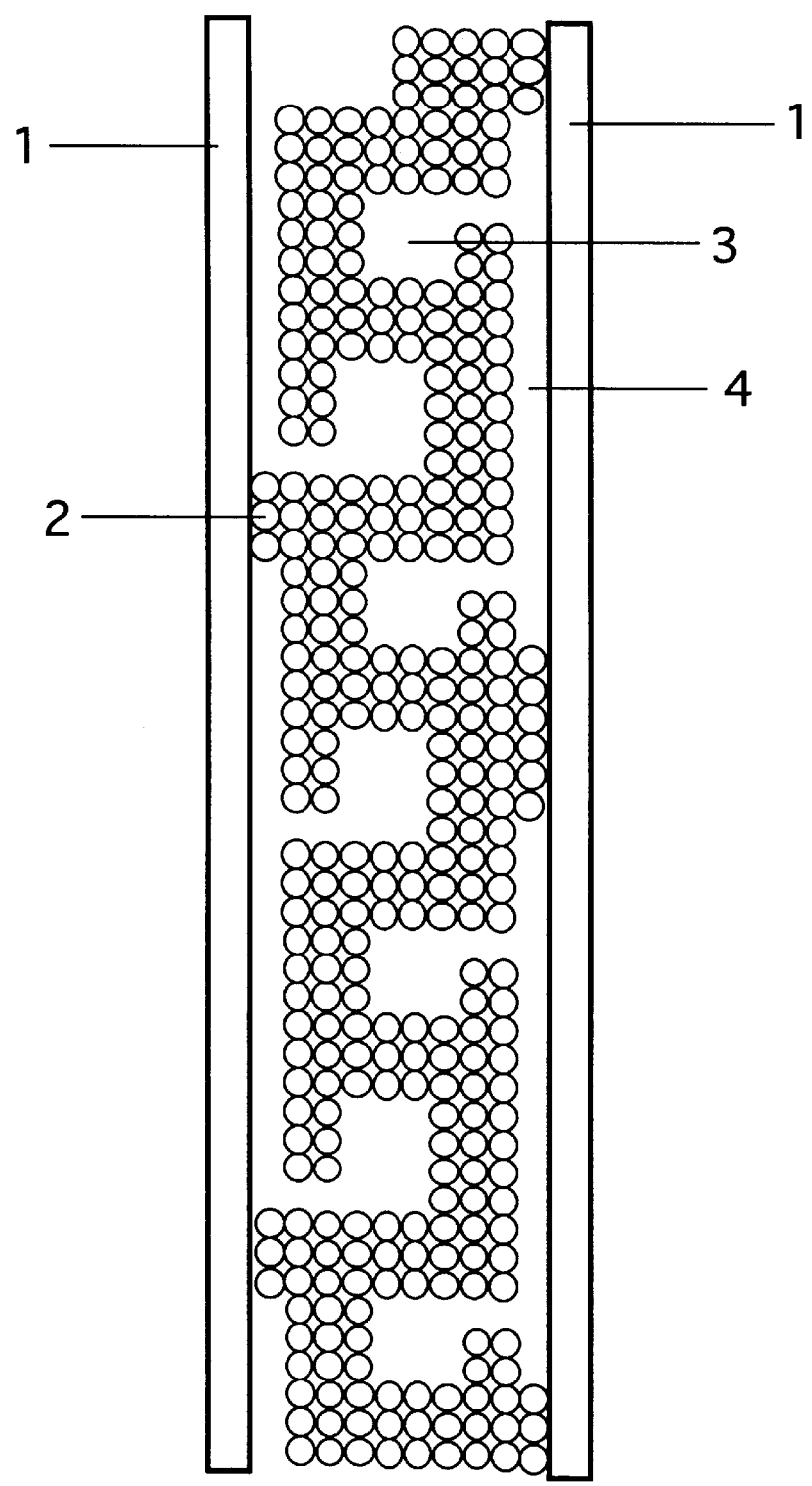
FIG. 1 is a cross-sectional view of an insulating panel or element having two outer facings (1) enclosing a synthetic foam core material (2) having cavities (3) of the present invention.

The synthetic foam core material (2) of the insulating panels or elements of the present invention can be made from any synthetic, compressible foam, such as, for example, polyolefin foams. Preferably, the foam core material of the present invention is prepared from a thermoplastic resin comprising, in polymerized form, a non-aromatic olefins, such as ethylene or propylene. Copolymers of ethylene and a copolymerizable polar monomer, especially a carboxyl-containing comonomer may also be employed.

Exemplary copolymers include copolymers of ethylene and acrylic acid (EAA) or methacrylic acid and $C_1$–$C_4$ alkyl esters or ionomeric derivatives thereof; ethylene-vinyl acetate copolymers; ethylene carbon monoxide copolymers; anhydride containing olefin copolymers of diene and a polymerizable monomer; copolymers of ethylene and an α-olefin having ultra low molecular weight (that is, less than 0.92 kg/m$^3$); blends of all the foregoing resins; blends thereof with high, intermediate, or low density polyethylene. Particularly preferred thermoplastic resins are polyethylene, polypropylene, EAA copolymers having up to 30 percent by weight of copolymerized acrylic acid; ionomeric derivatives of the foregoing; ethylene-vinyl acetate copolymers; ultra low molecular weight polyethylene; and blends thereof with low density polyethylene.

Additional components, such as crosslinking agents designed either to provide latent crosslinking of the ethylenic polymer, such as silane-functional crosslinking agents or covalent or ionic crosslinking agents, may be included if desired.

In one embodiment of the present invention, elastic, closed-cell, crosslinked and non-crosslinked polyethylene-based foam is employed as the core material for use in the multilayered insulating panels or elements. Elastic, closed-cell, crosslinked and non-crosslinked polyethylene-based foam having a plurality of coalesced distinguishable expanded strands of foamed polyethylene polymer is especially preferred as the core material for use in the multilayered insulating panels or elements of the present invention. The polyethylene-based foam having a plurality of coalesced distinguishable expanded strands of foamed polymer is commercially available under the designation Strandfoam® (trademark of The Dow Chemical Company).

Other materials useful to prepare foams for use as the core material in the present invention include, for example, those prepared from rigid polyurethane, polyvinyl chloride, polystyrene, both extruded and expanded.

When Strandfoam® polymer foam is chosen as the core material for use in the present invention, it is preferably prepared by the extrusion foaming of a molten thermoplastic composition utilizing a die containing a multiplicity of orifices. The orifices are so arranged such that the contact between adjacent streams of the molten extrudate occurs during the foaming process and the contacting surfaces adhere to one another with sufficient adhesion to result in an unitary structure. The Strandfoam® polymer foam is compounded and extruded according to the teaching of U.S. Pat. No. 4,824,720.

Figure 2:
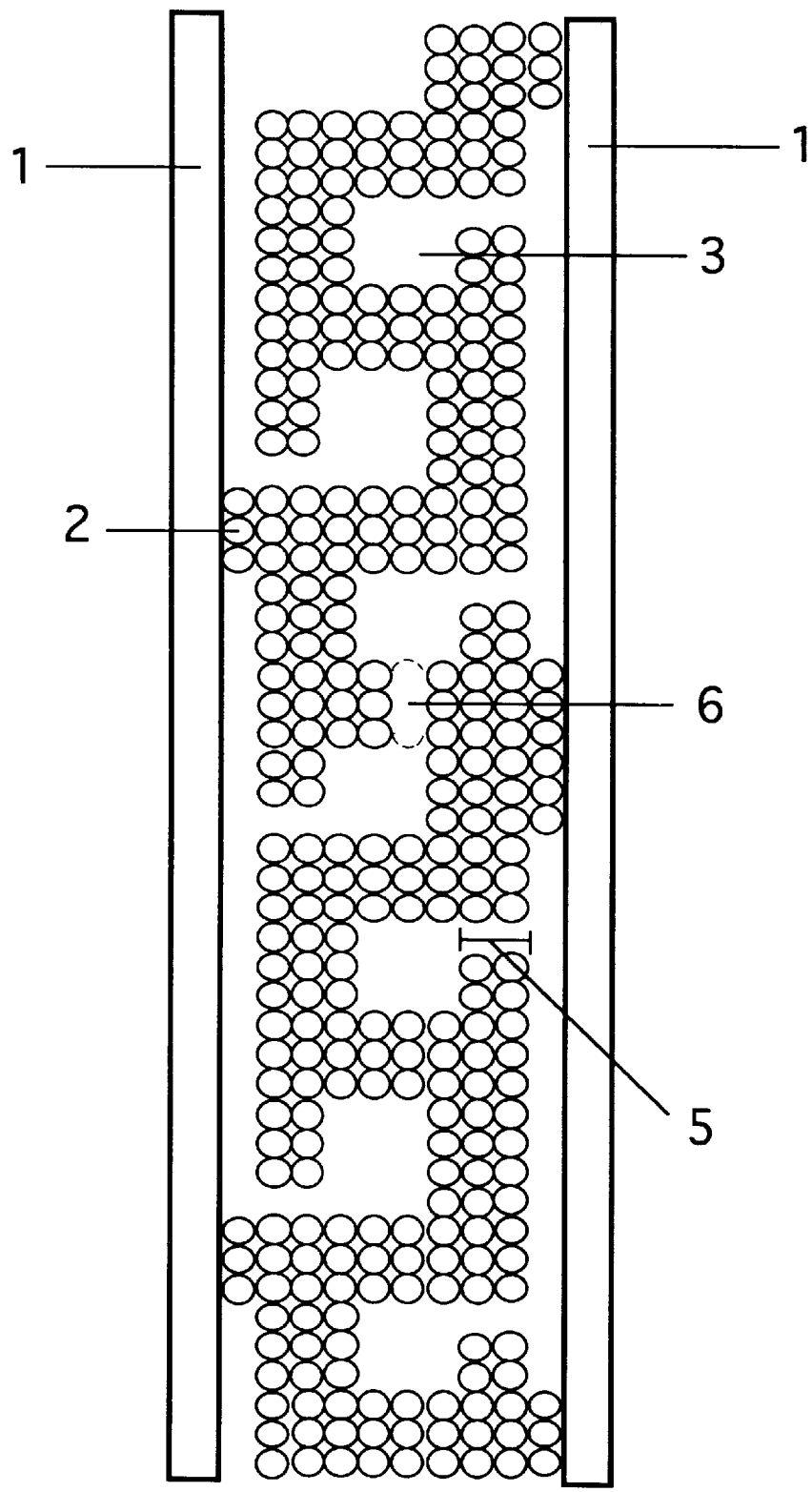
FIG. 2 is a cross-sectional view of an insulating panel or element of the present invention having two outer facings (1) enclosing a synthetic foam core material (2) having cavities (3) with necks (5), wherein the core material (2) also has channels (6).

The insulating panel or element is further illustrated in FIGS. 1 and 2. The outer facings (1) encompass the foam core material (2) having cavities (3). The foam core material (2) having cavities (3) extends substantially parallel to the outer facings (1). Typically the thickness of the core material layer is 30 to 100 millimeters (mm), preferably of about 50 mm.

Optionally, one of the two outer facings (1) is coupled with spacing devices (not shown). When employed, these spacing devices attached to one outer facing (1) should not contact the opposing outer facing (1). The distance between spacing devices and the facings (1) should be of at least 1 to 5 mm. The distance between the spacing devices depends on the thickness of the outer facings (1) and is typically between 400 and 600 mm. The cavities (3) of the foam core material (2) can be provided either by in situ extrusion or by manual or mechanical cutting techniques. For economical reason, the in situ extrusion of the cavities is preferred in the present invention.

The geometrical arrangement of the cavities (3) of the core material (2) according to the present invention shown in FIG. 1 represents a preferred embodiment of the present invention. However, it should be understood that different geometrical arrangements could be provided as long as the arrangement does not affect the acoustic insulating properties obtained in the present invention.

One preferred embodiment and aspect of the present invention is that the spacing devices, when employed, only have intimate contact with one side of one of the two outer facings (1) thereby providing a gap (4) between the core material (2) and the opposing outer facing (1). Another preferred and important aspect of the present invention is that the core material (2) contacts both outer facings, however in an alternate pattern. Yet another preferred aspect of the present invention is to provide a mass-spring-mass system with at least two springs in parallel but working in sequence, wherein the springs are provided by a single, continuous core material (2). That is, the gaps (4) represent a first spring working by bending and shear deformation and which is very soft and independent from the second spring represented by the core material (2) having cavities (3). The second spring works by compression and is 5 times to 100 times stiffer than the first one.

It is important that the stiffness ratio of the two springs of the core material (2) be sufficiently high to achieve the combination of acoustic and mechanical properties. The higher the stiffness ratio, the better the resulting acoustic and mechanical properties.

Although this invention is particularly described with respect to the preferred embodiment of a single, continuous core material providing two springs in parallel but working in sequence, it should be understood that the same effect, that is two springs in parallel but working in sequence, can be achieved by providing soft core material phases in a spaced relationship between the two outer facings in such a manner that both extremities of the soft core material are contacting the outer facings. In between such soft core material phases, a second core material having a higher density than the soft core material is provided in such a manner that only one extremity of each second core material phase contacts only one and the same outer facing. The second core material can be the same or different material as the soft core material as long as the density of the second material is higher than the density of the soft core material and provides the two springs described hereinbefore.

It has been found that regardless of the type of core material employed, that is, single, continuous core material or combination of soft core material and second core material, it is not critical that the core material occupies the entire volume between the two outer facings. Thus, it is another embodiment of the present invention to provide a multilayered insulating panel or element having two outer facings (1) and discontinuous core material phases. The core material phases in this particular embodiment could be in format of patches or stripes.

The cavities (3) within the core material (2) as well as the gaps (4) between the core material (2) and the outer facings (1), are preferably filled with air.

Depending on the geometrical arrangement of the cavities (3) of the core material (2), various physical phenomena can be observed. For example, the arrangement of cavities (3) of the core material (2) shown in FIG. 1 could function as Helmholtz resonators. Helmholtz resonators are well-known in the art and can be tuned to reduce the transmission of sound at certain frequencies. This can be achieved by giving suitable dimensions to the neck (5) of the resonator in relation to the volume of the cavities (3).

Another phenomenon can be described as air chambers within the mass-spring-mass system built around a [hollow profile] core material (2) having cavities and the two outer facings (1). The air volumes on each side of the core material (2), between said core material (2) and the outer facings (1) are separated by the air-tight core material. Particularly, by drilling channels (6) of suitable diameters into the separating core material layers, these air chambers will communicate and the phases of vibrations within can be controlled to reduce sound transmission.

Another aspect of the invention is that it is possible to use the core material (2) of the mass-spring-mass system as a damper. In a damper, the oscillating movement of a mass is dampened by the opposing movement of another mass, usually smaller, whose displacement, controlled by a suitable spring will reduce the oscillation of the first mass. The sound pressure variations will create oscillations on the outer facings of the panel which will transmit the vibrations to the other facing through the core material. Part of the core material, designed as deadweight attached to the spring system will be dimensioned so that its mass and cinetic energy resulting of the vibrations tends to work in phase opposition to the outer facing movement, therefore dampening its oscillation, source of noise transmission. Such deadweight as described is located between the contact points that link the outer facings. A controlled extrusion process of the core material allows to delete or add rods, therefore allows to get the desired effect.

The outer facings (1) can be made of any material typically employed to produce insulating panels or elements. Exemplary materials useful as outer facings include, for example, plastic or particle boards, thick paper or cardboards, fiber boards, gypsum plaster boards, a flexible plastic film or foil. Other materials useful as outer facings include, for example, metal sheets, such as steel, lead, or aluminum sheets, plywood, timber boards, chipboards, gypsum blocks, and bricks. The preferred material for use as the outer facings (1) in the present invention is gypsum board in the building applications and metal sheet in the industrial applications. Typically, the outer facings (1) are of a thickness of 0.5 mm to 150 mm, preferably 1 mm to 70 mm.

The insulating panels or elements of the present invention are prefabricated thereby avoiding the assembly thereof on the building site. The insulating panel or element of the present invention is useful in applications such as, for example, wall structures in buildings, vehicles, ships, apparatuses and machine installations.

In a preferred embodiment of the present invention, the insulating panel or element is employed as wall structures in buildings and acoustic insulation of machines.

The following examples are given to illustrate the invention and should not be interpreted as limiting it in any way. Unless stated otherwise, all parts and percentages are given by weight.

EXAMPLE 1

An insulating panel or element according to the present invention was built by assembling two gypsum board outer facings (one 13.0 mm thick and the other one 18 mm thick) containing a 55.0 mm thick strand foam core material. The panel was tested for acoustic insulating properties according to the standard test method ISO 717—1982. The results are shown in Table 1.

COMPARATIVE EXAMPLES A–F

Various insulating panels using prior art core materials were tested for acoustic insulating properties using the same test methods and procedures as Example 1. The results are shown in Table 1.

TABLE 1

| Example/Comp Example | Core Material | Thickness 1 mm | Weight 2, kg/m2 | Sound Reduction Index, dB |
|---|---|---|---|---|
| Ex. 1 | Strandfoam ® polymer foam | 84 | 24 | 43 |
| Comp. Ex. A* | Honeycomb | 50 | 21 | 28 |
| Comp. Ex. B* | Air/Timber | 101 | 22 | 35 |
| Comp. Ex. C* | Woodwool | 76 | 70 | 35 |
| Comp. Ex. D* | Mineral Wool/Timber | 125 | 42 | 40 |
| Comp. Ex. E* | Mineral Wool/Metal Stud | 74 | 21 | 41 |
| Comp. Ex. F* | Mineral Wool/Special Stud | 101 | 33 | 44 |

*Not an example of the present invention.
1 Total thickness of the panel.

TABLE 1-continued

| Example/Comp Example | Core Material | Thickness 1 mm | Weight 2, kg/m2 | Sound Reduction Index, dB |
|---|---|---|---|---|

2 Weight of the entire insulating panel or element
3 measured according to the test method ISO 717.

As readily apparent from the data shown in Table 1, the insulating panel or element of the present invention possesses comparable or even improved acoustic properties compared to comparative panels F and D although having a total thickness of 20 to 49 percent thinner, respectively, than these prior art panels.

I claim:

1. A multilayered insulating panel or element having both acoustic insulating properties and mechanical strength comprising:

(a) two outer facings (1), and
   (b) a soft synthetic core material (2) wherein the soft synthetic core material (2) is a single, continuous soft synthetic foam core material (2) having cavities (3), the core material (2) contacting both outer facings (1) in an alternate pattern, such that the core material (2) contacts only one of the two outer facings (1) at any point in a cross-section of the panel, thereby providing a gap (4) between the core material (2) and the opposing outer facing (1).

2. An insulating panel or element according to claim 1 further comprising spacing devices attached to one outer facing (1) but not contacting the opposing outer facing (1).

3. An insulating panel or element according to claim 2 wherein the spacing devices only have intimate contact with one outer facing (1) thereby providing gaps (4) between the spacing devices and the opposing outer facing (1).

4. An insulating panel or element according to claim 1 wherein the core material (2) functions as springs of different stiffness mounted in parallel but working in sequence.

5. An insulating panel or element according to claim 1 wherein the core material (2) is designed to function as a Helmholtz resonator.

6. An insulating panel or element according to claim 1 wherein the core material (2) defines independent air chambers connected by drilling the core material.

7. An insulating panel or element according to claim 1 wherein the core material (2) functions as a damper using the kinetic energy of the cavities (3).

8. An insulating panel or element according to claim 1 wherein the core material (2) is an elastic, closed-cell, crosslinked and non-crosslinked polyethylene-based foam having a plurality of coalesced distinguishable expanded strands of foamed polyethylene polymer.

9. An insulating panel or element according to claim 1 wherein the core material (2) is selected from the group consisting of rigid polyurethane, polyvinyl chloride, expanded polystyrene and extruded polystyrene.

10. An insulating panel or element according to claim 9 wherein the core material (2) is rigid polyurethane.

* * * * *